A. G. LAMB.
HAND TOOL.
APPLICATION FILED MAR. 23, 1908.
922,602.
Patented May 25, 1909.
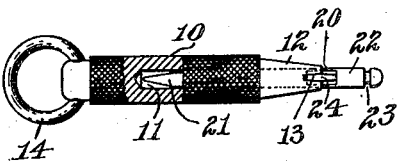
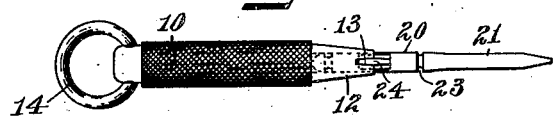
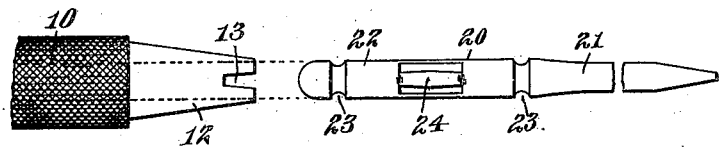
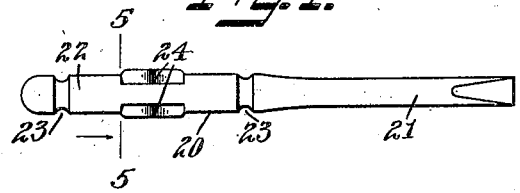
Witnesses.
Inventor.
Amherst G. Lamb,
By his Attorney,
F. H. Richards.

UNITED STATES PATENT OFFICE.

AMHERST G. LAMB, OF TORRINGTON, CONNECTICUT.

HAND-TOOL.

No. 922,602.  Specification of Letters Patent.  Patented May 25, 1909.

Application filed March 23, 1908. Serial No. 422,776.

*To all whom it may concern:*

Be it known that I, AMHERST G. LAMB, a citizen of the United States, residing in Torrington, in the county of Litchfield and State of Connecticut, have invented certain new and useful Improvements in Hand-Tools, of which the following is a specification.

This invention relates to hand tools wherein the blade portion is removably held in the handle and may be reversed so that the active part of the blade will be housed within the handle when not in use.

This invention is particularly applicable to screw drivers of the class which is intended to be carried in the pocket and wherein it is desired to not only get the blade, in so far as its active portion is concerned, within the handle, but also for the purpose of shortening the device when it is intended to be carried in the pocket. The smaller sizes of the device when made up as a screw driver may be such as will be used to tighten up the screws on spectacles and eye glasses, and in this instance the device will be small enough to carry in the pocket or in a pocket-book, or may, if desired, be provided with suitable means whereby it may be attached to a watch chain and worn as a charm.

In the drawings accompanying and forming a part of this specification, Figure 1 is a side view of a pocket screw driver embodying my present improvements. In this instance the blade is shown located within the handle, a portion of the handle is shown in central section. Fig. 2 is a view similar to Fig. 1, but showing the blade in its operative position. Fig. 3 is an enlarged view of the tool portion, and a broken away end of the handle portion. Fig. 4 is a view of the tool shown in Fig. 3 but showing this turned upon its axis about a quarter of a revolution; and Fig. 5 is a section of Fig. 4 on the line 5—5, looking in the direction of the arrow.

In the form of my invention which is illustrated the handle portion 10 is provided with a centrally disposed cylindrical socket 11 which enters one end of the handle, which end is tapered at 12, and this socketed, tapered end is provided with longitudinal slots 13, disposed radially of the handle. The ends of which slots are shown as tapering or flaring outward. The lips formed at the end of the handle by this tapering, socketing and slotting, are slightly resilient.

The tool which is illustrated herein for employment with the handle comprises a shank portion 20 which will have a working fit with the socket 11 of the handle. The shank is shown as carrying at one end a screw driver blade 21, and its end 22 will constitute a finger grip. The respective ends of the shank are provided with circumferentially disposed grooves 23 to increase the gripping action of the fingers upon the ends when it is desired to withdraw the shank from the socket. For the purpose of preventing the shank from turning in the socket, and for holding it in position against accidental displacement, it is provided with longitudinally disposed fins 24 which are shown as tapering toward each end of the shank. The fins may be made upon the shank of the blade by some suitable means, as for instance, rolling or stamping with a die in such a manner that they are integral with such blade. One edge of the fin is secured to the shank and the other edge projects therefrom and it is the side faces of the fins which are tapered toward the ends, and it is this lateral tapering which forms the fins into wedges pointing in opposite directions and having the wedge faces laterally disposed upon a fin having its edge fast with the tool shank. When the tool is intended for reversal in the handle both ends of the fin will be tapered on its sides.

It will be seen that when the device is intended to be used for a screw driver, if it is a screw driver, that the finger grip end 22 will be taken hold of by the fingers of one hand, the groove 23 assisting the grip of the fingers, and the handle 10 will be taken hold of by the other hand, its knurled or roughened exterior assisting the grip upon this, and the shank moved longitudinally of the socket, in this manner disengaging the fins 24 from the slots 13, after which the tool will be inverted and the grip end 22 of the shank inserted in the socket and forced into such a position that the other ends of the wedge shaped fins will engage the slots. This engagement of the fins and the slots not only prevents the shank from turning in the socket, but also limits the inward movement of the shank and prevents its outward displacement.

As above stated the lips at the open end of the socket in the handle may be slightly resilient and cause it to spring sufficiently upon the entrance of the wedges into the slots for increasing the frictional engagement between the edges of the slots and the fins.

The end of the handle may be provided with a ring 14 whereby the implement may be carried on a key-ring or on a watch chain.

In practice screw drivers have been made up embodying my invention of a size about half that illustrated in Figs. 1 and 2, which screw drivers are very convenient for carrying with one for use in tightening up the screws of eye glass and spectacle frames.

Having described my invention I claim:

1. The combination with a handle having a tapered end and provided with a substantially cylindrical socket entering said tapering end, of a blade having a shank provided with longitudinally disposed fins tapering laterally at the ends directed away from the blade, the handle being slotted longitudinally of the end for receiving the fins of the shank, and the material of the handle at the slotted portion presenting thin resilient lips for elastically engaging the tapering side faces of the fins.

2. The combination with a handle having a socket entering one end and said handle at said end being provided with slots, of a tool having a shank portion for entering said socket, one end of said shank carrying a blade and the other end of said shank carrying a finger grip, said shank being provided with longitudinally disposed fins tapering laterally toward each end of the shank for frictionally engaging said slots.

3. In a screw driver, the combination with a handle provided with a socket entering one end, said end of the handle being provided with slots flaring toward said end, of a tool having a shank for entering said socket, one end of said tool being provided with a screw driver blade and the other end being provided with a finger grip, each end of said shank being provided with gripping means, and said shank being also provided with fins disposed longitudinally thereof and tapering laterally toward the respective ends of the shank for entering and frictionally engaging said slots, and suspending means at one end of the handle.

A. G. LAMB.

Witnesses:
D. HILDRETH,
F. L. ROWE.